(12) United States Patent
Zimmerman (10) Patent No.: US 11,710,375 B2
(45) Date of Patent: Jul. 25, 2023

(54) DEVICE AND PROCESS FOR PROVIDING MOBILE GAMIFICATION

(71) Applicant: TracFone Wireless, Inc., Miami, FL (US)

(72) Inventor: James Zimmerman, Miami, FL (US)

(73) Assignee: Tracefone Wireless, Inc., Miami, FL (US)

( * ) Notice: Subject to any disclaimer, the term of this patent is extended or adjusted under 35 U.S.C. 154(b) by 282 days.

(21) Appl. No.: 17/108,155

(22) Filed: Dec. 1, 2020

(65) Prior Publication Data

US 2021/0104124 A1   Apr. 8, 2021

Related U.S. Application Data

(63) Continuation of application No. 16/512,968, filed on Jul. 16, 2019, now Pat. No. 10,854,043, which is a (Continued)

(51) Int. Cl.
| | | |
|---|---|---|
| *G07F 17/00* | (2006.01) | |
| *G07F 17/32* | (2006.01) | |
| *H04L 67/00* | (2022.01) | |
| *G06Q 50/00* | (2012.01) | |
| *G06Q 30/0251* | (2023.01) | |
| *H04W 4/029* | (2018.01) | |
| *A63F 13/2145* | (2014.01) | |
| *A63F 13/92* | (2014.01) | |
| *A63F 13/35* | (2014.01) | |

(Continued)

(52) U.S. Cl.
CPC ...... *G07F 17/3255* (2013.01); *A63F 13/2145* (2014.09); *A63F 13/35* (2014.09); *A63F 13/92* (2014.09); *G06Q 30/0261* (2013.01); *G06Q 50/01* (2013.01); *G07F 17/323* (2013.01); *G07F 17/3209* (2013.01); *G07F 17/3211* (2013.01); *G07F 17/3241* (2013.01); *G07F 17/3253* (2013.01); *H04L 51/52* (2022.05); *H04L 67/01* (2022.05); *H04L 67/131* (2022.05); *H04L 67/34* (2013.01); *H04W 4/02* (2013.01); *H04W 4/029* (2018.02); *H04L 12/1822* (2013.01); *H04W 4/12* (2013.01); *H04W 80/04* (2013.01); *H04W 88/02* (2013.01)

(58) Field of Classification Search
None
See application file for complete search history.

(56) References Cited

U.S. PATENT DOCUMENTS

| | | |
|---|---|---|
| 7,618,312 B1 | 11/2009 | Kasten |
| 8,413,206 B1 | 4/2013 | Wyatt et al. |
| | | (Continued) |

*Primary Examiner* — Paul A D'Agostino (57) ABSTRACT

A wireless device to provide mobile gamification services includes a transceiver configured to transmit data, an application to remotely connect via a network to a mobile website, to download a game from the mobile website to the wireless device, to execute the game locally on the wireless device, to execute the game via the mobile website, to redeem game rewards associated with wireless services, and to select the game rewards associated with the wireless services, a processor to control the transceiver and execute the application, a display to display the game and the game rewards, and a computer readable medium to store the application and user preferences associated with the game and with the wireless services.

20 Claims, 5 Drawing Sheets

Related U.S. Application Data continuation of application No. 15/218,673, filed on Jul. 25, 2016, now Pat. No. 10,354,490.

(60) Provisional application No. 62/349,393, filed on Jun. 13, 2016.

(51) Int. Cl.
  *H04L 51/52* (2022.01)
  *H04L 67/01* (2022.01)
  *H04L 67/131* (2022.01)
  *H04W 4/02* (2018.01)
  *H04W 80/04* (2009.01)
  *H04W 88/02* (2009.01)
  *H04W 4/12* (2009.01)
  *H04L 12/18* (2006.01)

(56) References Cited

U.S. PATENT DOCUMENTS

| | | | | |
|---|---|---|---|---|
| 2006/0258397 A1* | 11/2006 | Kaplan | | H04W 4/24 |
| | | | | 455/406 |
| 2008/0207296 A1* | 8/2008 | Lutnick | | G07F 17/3241 |
| | | | | 463/16 |
| 2008/0227500 A1* | 9/2008 | Heyworth | | H04N 21/43637 |
| | | | | 455/566 |
| 2009/0063270 A1* | 3/2009 | Bengtsson | | G06Q 30/0212 |
| | | | | 705/14.14 |
| 2009/0156181 A1* | 6/2009 | Athsani | | H04L 67/53 |
| | | | | 455/414.2 |
| 2009/0325666 A1* | 12/2009 | Salmon | | G07F 17/3223 |
| | | | | 463/16 |
| 2010/0022307 A1* | 1/2010 | Steuer | | G06Q 90/00 |
| | | | | 463/42 |
| 2010/0029376 A1 | 2/2010 | Hardy et al. | | |
| 2012/0150695 A1* | 6/2012 | Fan | | G06Q 30/02 |
| | | | | 705/27.1 |
| 2012/0329555 A1* | 12/2012 | Jabara | | G06Q 30/0267 |
| | | | | 463/29 |
| 2013/0096996 A1* | 4/2013 | Tabor | | G06Q 30/0207 |
| | | | | 705/14.1 |
| 2013/0127980 A1 | 5/2013 | Haddick et al. | | |
| 2013/0262203 A1 | 10/2013 | Frederick et al. | | |
| 2013/0282454 A1* | 10/2013 | Alpert | | G06Q 30/0209 |
| | | | | 705/14.12 |
| 2014/0004939 A1 | 1/2014 | Kasten | | |
| 2014/0018155 A1* | 1/2014 | Nelson | | G07F 17/3211 |
| | | | | 463/25 |
| 2014/0106866 A1* | 4/2014 | Hardy | | G07F 17/3244 |
| | | | | 463/25 |
| 2014/0207950 A1 | 7/2014 | Badiee et al. | | |
| 2014/0274390 A1 | 9/2014 | Kasten | | |

* cited by examiner

DEVICE AND PROCESS FOR PROVIDING MOBILE GAMIFICATION

CROSS REFERENCE TO PRIOR APPLICATIONS

This application is a continuation of U.S. patent application Ser. No. 16/512,968, filed Jul. 16, 2019 now U.S. Pat. No. 10,854,043 issued Dec. 1, 2020, which is incorporated herein by reference in its entirety; which application is a continuation of U.S. patent application Ser. No. 15/218,673, filed Jul. 25, 2016 now U.S. Pat. No. 10,354,490 issued Jul. 16, 2019, which is incorporated herein by reference in its entirety; which application claims the benefit from U.S. Provisional Application No. 62/349,393 filed on Jun. 13, 2016, which is hereby incorporated by reference for all purposes as if fully set forth herein.

BACKGROUND OF THE DISCLOSURE

1. Field of the Disclosure

The disclosure relates to a wireless device and process for providing mobile gamification. More specifically, the disclosure relates to a device and process for providing mobile gamification for a wireless device associated with wireless services.

2. Related Art

Gamification is the concept of applying game mechanics and game design techniques to engage and motivate people to achieve their goals. Gamification taps into the basic desires and needs of the user's impulses, which revolve around the idea of status and achievement. Gamification techniques strive to leverage people's natural desires for competition, achievement, status, altruism, community collaboration, and the like. Competition is another technique that can be used in gamification. The desire to appear on the leader board drives players to complete more tasks, in turn fueling deeper engagement.

Many gamification approaches are utilized by businesses to drive customer satisfaction and sales of services. However, there are currently no gamification processes for wireless devices associated with wireless service.

Accordingly, there is a need to provide mobile gamification services on wireless devices associated with wireless service.

SUMMARY OF THE DISCLOSURE

The foregoing needs are met, to a great extent, by the disclosure, providing a device and method for providing mobile gamification to wireless devices associated with wireless services.

According to some aspects of the disclosure, a wireless device configured to provide mobile gamification services, the wireless device including a transceiver configured to transmit data, a processor configured to control the transceiver and execute an application, the application configured to remotely connect utilizing the transceiver to a mobile website via network, the application is further configured to at least one of the following: download a game from the mobile website to the wireless device to execute the game locally on the wireless device and execute the game remotely via the mobile website, the application further configured to receive a request to select and redeem game rewards associated with wireless services, a display to display the game and the game rewards, and a computer readable medium configured to store the application and user preferences associated with the game.

According to some aspects of the disclosure, a process to provide mobile gamification services with a wireless device, the process including transmitting data with a transceiver, controlling the transceiver and executing an application with a processor, remotely connecting utilizing the transceiver to a mobile website via network, executing the application to at least one of the following: download a game from the mobile website to the wireless device to execute the game locally on the wireless device and execute the game remotely via the mobile website, receiving a request to select and redeem game rewards associated with wireless services based on an interaction with the application, displaying the game and the game rewards with a display, and storing the application and user preferences associated with the game in a computer readable medium.

According to some aspects of the disclosure, a system configured to provide mobile gamification services on a wireless device, the system including a server configured to transmit data to the wireless device, the server further configured to remotely connect the wireless device to a mobile website via network, the server further configured to at least execute a game remotely via the mobile website, the server further configured to provide game rewards for display on a display of the wireless device, the server further configured to receive a request to select and redeem game rewards associated with wireless services based on the game, and the server further configured to store user preferences associated with the game and with the wireless services in a computer readable medium.

There has thus been outlined, rather broadly, certain aspects of the disclosure so that the detailed description thereof herein may be better understood, and so that the present contribution to the art may be better appreciated. There are, of course, additional aspects of the disclosure described below and which will also form the subject matter of the claims.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as in the abstract, are for the purpose of description and should not be regarded as limiting.

As such, those skilled in the art will appreciate that the conception upon which this disclosure is based may readily be utilized as a basis for the designing of other structures, methods, and systems for carrying out the several purposes of the disclosure. It is important, therefore, that the claims be regarded as including such equivalent constructions insofar as they do not depart from the spirit and scope of the disclosure.

BRIEF DESCRIPTION OF THE DRAWINGS

The above mentioned features and aspects of the disclosure will become more apparent with reference to the following description taken in conjunction with the accompanying drawings wherein like reference numerals denote like elements and in which.

DETAILED DESCRIPTION

In this disclosure and in the claims it is to be understood that reference to a wireless device is intended to encompass electronic devices such as mobile phones, controllers, tablet computers, personal computers, PDAs, and the like. A "wireless device" is intended to encompass any compatible mobile technology computing device that can connect to a wireless communication network. A wireless device further includes mobile phones, mobile equipment, mobile stations, user equipment, cellular phones, smartphones, handsets, or the like (e.g., Apple iPhone, Google Android based devices, BlackBerry based devices, other types of PDAs or smartphones), wireless dongles, remote alert devices, or other mobile computing devices that may be supported by a wireless network. The term "wireless device" may be interchangeably used and referred to herein as "wireless handset," "handset," "mobile device," "device," "mobile phones," "mobile equipment," "mobile station," "user equipment," "cellular phone," "smartphones," "monitoring device" or "phone."

Wireless devices may connect to a "wireless network" or "network" and are intended to encompass any type of wireless network to obtain or provide mobile phone, gamification services, and messaging services through the use of a wireless device, such as the Global System for Mobile Communication (GSM) network, Code-Division Multiple Access (CDMA) network, Long-Term Evolution (LTE) network, 5G (Fifth Generation), Wireless Fidelity (Wi-Fi) network, and the like that may utilize the teachings of the present application to transmit and process gamification services. In one aspect, the wireless device may connect over Wi-Fi. In one aspect, the wireless device may connect over broadband Cellular. In one aspect, the wireless device may connect over any data bearer communication channel as defined herein.

Reference in this disclosure to "one aspect," "an aspect," "other aspects," "one or more aspects" or the like means that a particular feature, structure, or characteristic described in connection with the aspect is included in at least one aspect of the disclosure. The appearances of, for example, the phrase "in one aspect" in various places in the disclosure are not necessarily all referring to the same aspect, nor are separate or alternative aspects mutually exclusive of other aspects. Moreover, various features are described which may be exhibited by some aspects and not by others. Similarly, various requirements are described, which may be requirements for some aspects but not for other aspects.

In one or more aspects of the disclosure, businesses can use the disclosed gamification to drive desired user behaviors that are advantageous to their brand. In one or more aspects of the disclosure, gamification may be used to increase engagement by rewarding users who accomplish desired tasks. In one or more aspects of the disclosure, gamification may also be a very practical technique to take advantage of big data. Gamification is a powerful tool for motivating better performance, driving business results, and generating a competitive advantage. In one or more aspects, the disclosure contemplates capturing and analyzing the big data on behaviors and businesses can create a more engaging experience that motivates users. In one or more aspects, the disclosure contemplates generating extensive insight into user behavior in the form of the data. This big data can indicate what activities, content types, and frequencies are yielding the best results. Aspects of the disclosure also contemplate providing insight for companies to adapt to various user behaviors and motivations. In one or more aspects of the disclosure, the gamification and the big data may also be used to understand not only how the users are behaving, but also to ask why and to also develop creative ideas to improve systems, devices, and services. In one or more aspects, the process also allows for a recommendation, marketing and promoting of business services through gameplay and prizes. In this regard, the big data may capture behaviors of the wireless users that may be analyzed in order to ascertain recommendations regarding marketing and promoting business services based on the captured behaviors.

In one or more aspects of the disclosure, the gamification may include rewards. The rewards such as points, certificates, badges, elevated status, and the like may be earned by users for completing tasks, sharing information, purchasing wireless services, and the like. In one aspect, wireless service providers, for example, may use rewards to encourage particular behavior from users, to promote services, and to gather behavioral and preferential information about wireless service users. In one or more aspects, the process can drive increased sales and revenue through data analytics and modelling. Such information may be used to customize services and content, and to optimize the type and frequency of content provided to wireless service users.

In one or more aspects of the disclosure, game mechanics and game features may be designed to boost certain metrics. In certain gamification aspects of the disclosure, it may be critical to monitor the performance of metrics closely to ensure the user is getting the best results possible and that users are happy. The main measurable metrics of success include, but are not limited to: engagement, influence, loyalty, user generated content, time spent, virality, and the like.

Generally, companies that provide post-paid wireless services are wireless carriers or Mobile Network Operators (MNO) that maintain and control their own wireless networks. An MNO heavily relies on backend systems to address any provisional, billing, security, and data issues that might threaten the health of their networks. On the other hand, a Mobile Virtual Network Operator (MVNO) is a mobile operator that typically does not own its own frequency spectrum or have its own network infrastructure. MVNOs negotiate and enter into business agreements with third party wireless carriers or MNOs to purchase the right to use their networks for wireless services. In one aspect, the disclosure relates to providing mobile gamification for a wireless device associated with wireless services for a MNO. In one aspect, the disclosure relates to providing mobile gamification for a wireless device associated with wireless services for a MVNO.

Figure 1:
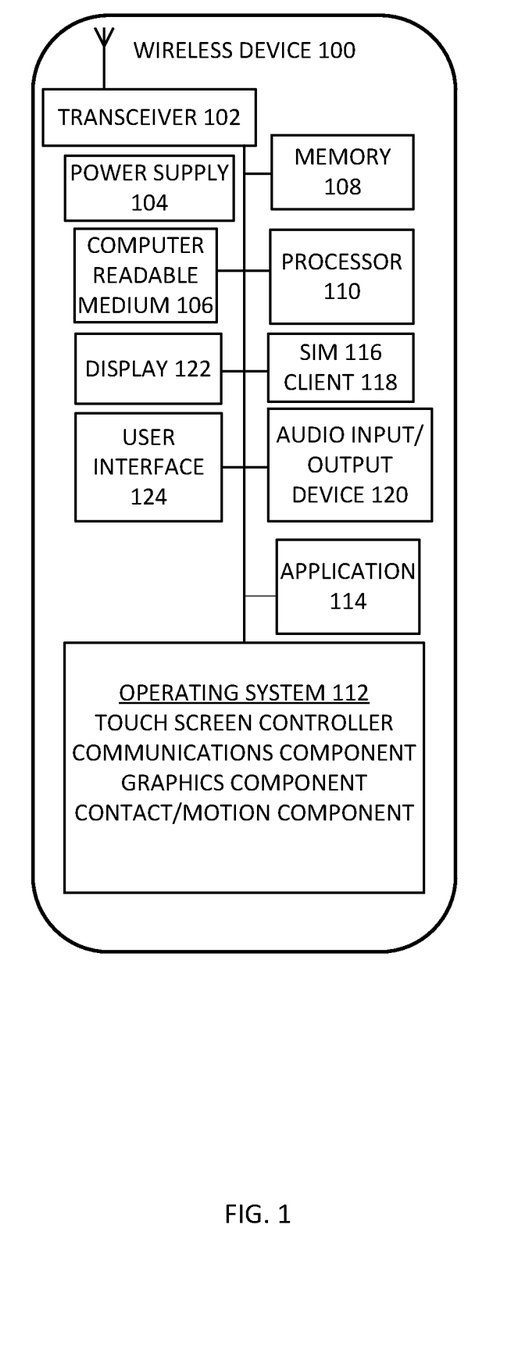
FIG. 1 illustrates a wireless device and its associated components, in accordance with aspects of the present disclosure.

FIG. 1 illustrates an exemplary wireless device 100 and its associated components. The wireless device 100 may include a transceiver 102, a power supply 104, a computer readable medium 106, a memory 108, a processor 110, an operating system 112, an application 114, and the like. In some aspects, the wireless device 100 may further include a subscriber identity module (SIM) card 116, a client 118, an audio input/output device 120, a display 122, a user interface 124, and the like.

The transceiver 102 of the wireless device 100 can include, for example, a wireless antenna and associated circuitry capable of data transmission with the mobile data network utilizing at least one data transmission protocol, such as, for example, 3G, 4G Long Term Evolution (LTE), 5G, Evolution-Data Optimized (EVDO), Code Division Multiple Access (CDMA), High Speed Packet Access (HSPA), Global System for Mobile Communications (GSM), W-CDMA (Wideband Code-Division Multiple Access), Wi-Fi, Bluetooth, a communication channel as defined herein, and/or combinations thereof. The transceiver 102 may transmit and receive data, such as activation notifications, redemption notifications, policy charging and rules function notifications, gamification messages and data, offers and promotions, and the like. The power supply 104 may be a battery such as nickel cadmium, nickel metal hydride, lead acid, lithium ion, lithium ion polymer, and the like. The power supply 104 may also be wired to a power receptacle or any other power source.

The computer readable medium 106 may be configured to store, for example, the application 114, customer information, user preferences, and the like. For the purposes of this disclosure, the computer readable medium 106 may store computer data, which may include computer program code that may be executable by the processor 110 of the wireless device 100 in machine readable form. By way of example, and not limitation, the computer readable medium 106 may include computer readable storage media, for example tangible or fixed storage of data, or communication media for transient interpretation of code-containing signals. Computer readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules, or other data. In one or more aspects, the actions and/or events of a method, algorithm, or module may reside as one or any combination or set of codes and/or instructions on a computer readable medium 106 or machine readable medium, which may be incorporated into a computer program product.

The display 122 of the wireless device 100 can display various information provided to the display 122 from the processor 110, the computer readable medium 106, the SIM card 116, and/or the like. The screen may be a light-emitting diode display (LED), an electroluminescent display (ELD), a plasma display panel (PDP), a liquid crystal display (LCD), an organic light-emitting diode display (OLED), or any other display technology.

The displayed information can include, for example, text and data messages, gamification messages, confirmation messages, the network connection strength, the type of mobile network data connection (such as 3G, 4G LTE, 5G, EVDO, etc.) the wireless device 100 is connected to, and/or other information potentially useful to the user. The information may be displayed simultaneously or the user may interact with an input device such as buttons on the wireless device 100 or, if the display 122 is a touch-screen, with the icons on the display 122 to cycle through the various types of information for display. The buttons may include activation and deactivation buttons, selection buttons, arrows, scroll buttons, alphanumeric keys, and the like. The display 122 may present text and data messages, confirmation messages, gamification messages, the network connection strength, and the type of mobile network data connection simultaneously. Alternatively, the display 122 may only present one type of information, for example, text and data messages corresponding to gamification promotions, gamification status, gamification rewards, monitoring status, and the like. The display 122 may then present other types of information if the user interacts with buttons on the wireless device 100 or, if the display is a touch-screen, with icons on the display 122.

The wireless device 100 may also have the user interface 124 to facilitate use of the wireless device 100 with an operating system 112. The operating system 112 may be associated with a touchscreen controller, one or more communications components, one or more graphics components, one or more contact/motion components, and the like.

The memory 108 of the wireless device 100 may be an internal memory or a removable storage type such as a memory chip. The memory 108 may store information about the wireless device 100, including the default and/or current location. Another information storage type that the wireless device may use is a SIM card 116. Additionally, the wireless device 100 may include the audio input/output device 120 for the input or output of sounds in data messages, alerts, phone calls, games, videos, music, and the like.

The processor 110 may be configured to execute the application 114. The processor 110 can be, for example, dedicated hardware as defined herein, a computing device as defined herein, a processor, a microprocessor, a programmable logic array (PLA), a programmable array logic (PAL), a generic array logic (GAL), a complex programmable logic device (CPLD), an application-specific integrated circuit (ASIC), a field-programmable gate array (FPGA), or any other programmable logic device (PLD) configurable to execute the application 114 and to facilitate the transmission of data.

The application 114 may be an electronic application or software application configured to provide gamification services. The application 114 may be written in any programming language, such as, for example, C, Java, Objective-C, C+, Python, Visual Basic, Perl, or any other programming language the processor 110 is capable of executing. The types of gamification services managed by the application 114 may include games, activity tracking, location tracking, advertising and offers, organizational applications, wireless services management, music, videos, social media applications, and the like.

The application 114 may facilitate access to a web-based system with a mobile website, which may provide gamification services. For example, the application 114 may allow the wireless device 100 to access, on a mobile website or the like, a remote provider of gamification games and activities to be executed with the wireless device 100. In such an example, the application 114 may be a web browser, which may connect to a website hosting one or more gamification games and activities. The gamification games and activities can be remotely executed over the Internet with the application 114. The application 114 may be configured to operate utilizing Standard web technologies such as HTML, Cascading Style Sheets (CSS), PHP, JavaScript, SVG, canvas, Flash, Java, Shockwave, Silverlight, Unity, and the like. In one aspect, the gamification services do not necessarily require an application or client to be resident on the wireless device 100 in order to function. This allows the process to be completely device type (Feature Phone or Smartphone), OS, and/or bearer agnostic.

In another aspect of the disclosure, the application 114 may facilitate local execution of gamification games and activities on the wireless device 100. For example, the application 114 may be a game or tool stored locally on the wireless device 100 to execute. Games and tools stored on the wireless device 100 may be downloaded from a website, a database of applications, and the like.

In some aspects of the disclosure, the games could include concepts such as "spin to win," slot machine, pick a card, shell game, pick one, first-person shooter games, real-time strategy games, multi-user real-time virtual worlds, massively multiplayer online games, micromanagement and macromanagement games, single-player games, multiplayer games, arcade games, video arcade games, simulated gambling type games, fantasy sports games, and the like. When a customer participates in any transactional process of such games, the user may receive additional chances for their next redemption or activity. Chances may be counted and displayed for the user when the game, activity, web page, or the like is rendered for the wireless device 100.

Figure 2:
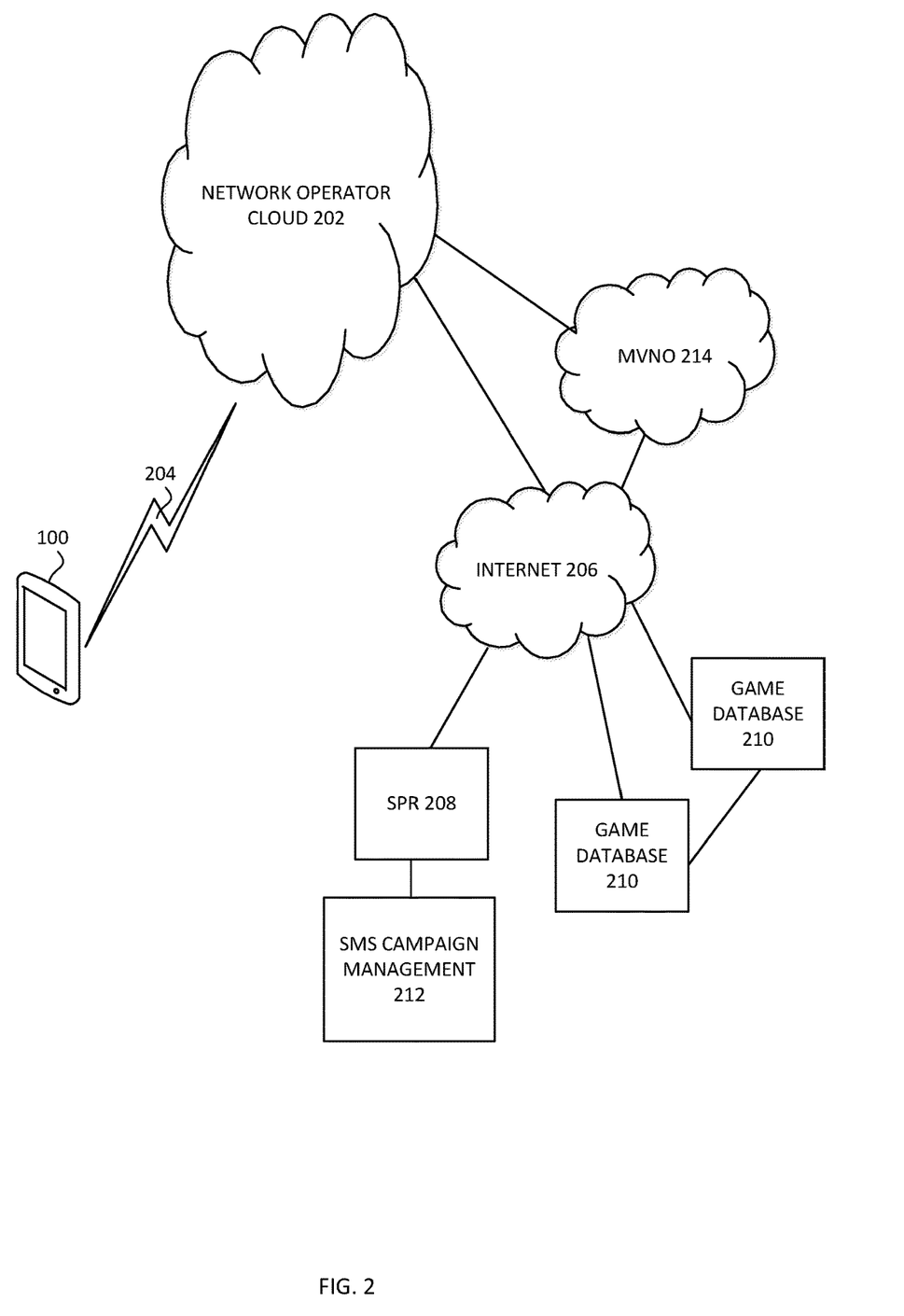
FIG. 2 illustrates a system, which can provide mobile gamification for the wireless device in FIG. 1, in accordance with aspects of the present disclosure.

FIG. 2. Illustrates a system, which can provide mobile gamification for the wireless device 100 in FIG. 1. The wireless device 100 may connect with a network operator cloud 202 via a communication channel 204. The network operator cloud 202 may have one or more base transceiver stations and the like to facilitate communication between the wireless device 100 and a network. The network operator cloud 202 may also have one or more servers and processors to facilitate communications between the network operator cloud 202 and the wireless device 100, a Subscriber Profile Repository (SPR) 208, a game database 210, a game hosting server 216, and the like. The network operator cloud 202 may connect the wireless device 100 to the Internet 206.

The SPR 208 may provide information about the user of the wireless device 100 in order to verify the user's identity, brand, activity, and the like. The SPR 208 or another database may also collect and store user preferences based on the user's activity with the wireless device 100.

Once the user has been verified, the game database 210 may provide gamification game options to the wireless device 100. The wireless device 100 may play such games remotely via a connection with the Internet 206 or locally after downloading the games from a mobile website, such as the game hosting server 216, on the Internet 206 or from the game database 210 to the wireless device 100. Alternatively, a Short Message Service (SMS) Campaign Management database 212 may coordinate with the SPR 208 to provide promotional or invitational SMS messages or the like to the wireless device 100.

The promotional and invitational SMS messages may include a URL link to a particular game or to a website with game options. The URL link may be a single use URL with the user's encrypted information. The promotional and invitational SMS messages may also include encrypted user data from the SPR 208 or another database. If a user clicks on the URL from the SMS message, for example, the wireless device 100 may connect to a mobile website, such as the game hosting server 216, on the Internet 206 to execute or download one or more gamification games, tools, and the like. In the example of a single use URL link, there may be certain promotions, discounts, bonuses, and the like for executing a particular game or application, performing certain tasks, and the like within a certain time period, such as only after executing the single use URL link. That way, single use URL links may create an incentive to execute or download a game or application when a user receives a gamification offer.

When the wireless device 100 executes a URL link to a game or application, executes a game or application, downloads a game or application, or has any other interaction with a gamification game or activity, the SPR 208, the game database 210, the game hosting server 216, or another database may capture and track the activity and usage of gamification activities for the wireless device.

In one aspect, an MVNO network or cloud 214 may implement the SPR 208, the game database 210, the game hosting server 216, or another database. In one aspect, the MVNO network or cloud 214 may receive information from the SPR 208, the game database 210, the game hosting server 216, or another database. In one aspect, any one of the functions and features of the SPR 208, the game database 210, the game hosting server 216, or another database may be combined.

Figure 3:
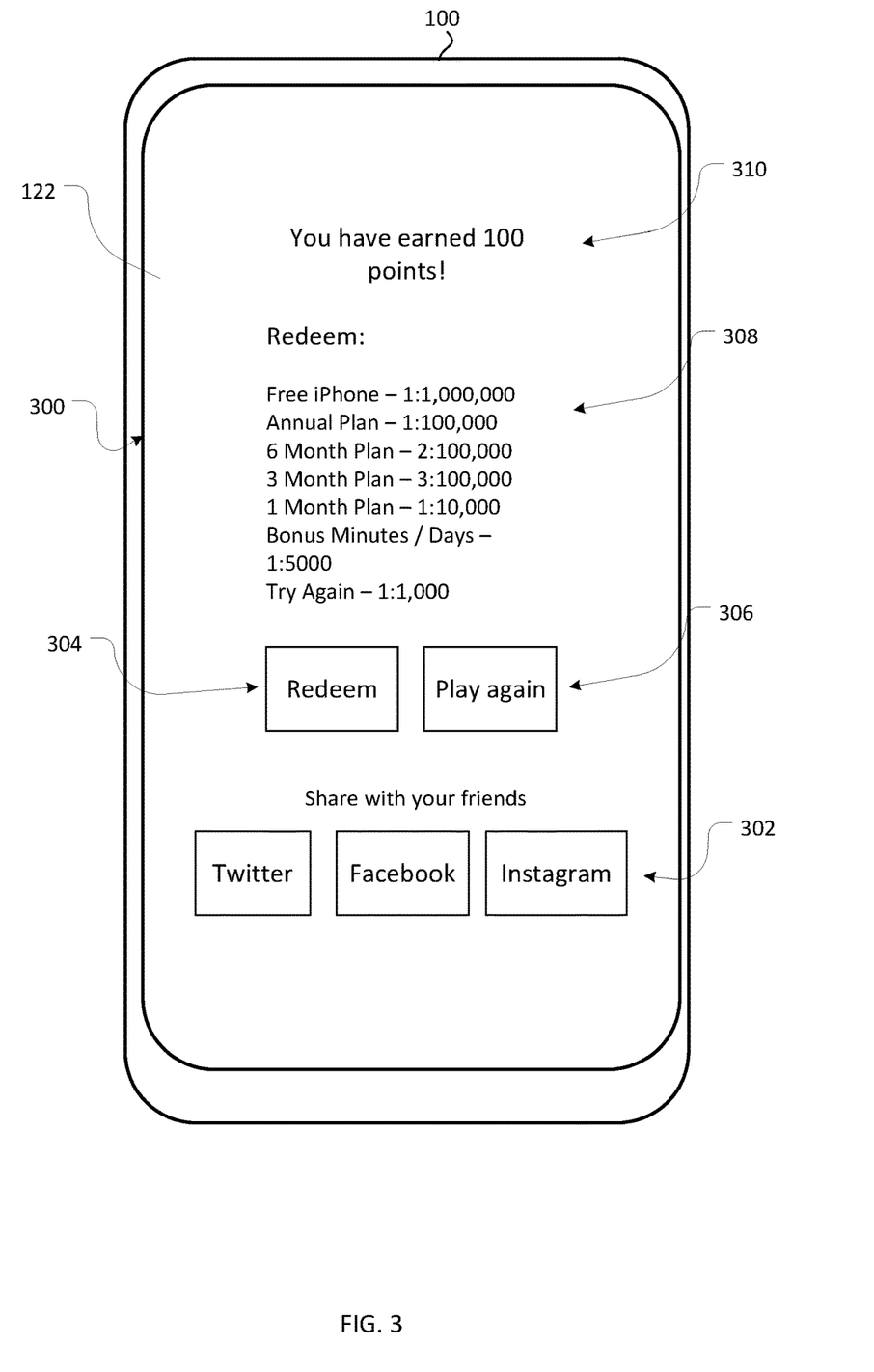
FIG. 3 illustrates mobile gamification on the wireless device of FIG. 1, in accordance with aspects of the present disclosure.

FIG. 3 illustrates an example of mobile gamification on the wireless device 100. The application 114 may remotely connect to a web page rendered by game hosting server 216 via the transceiver 102. The remote connection may be initiated by the user of the wireless device 100, or may be in response to an invitation from the wireless service provider. The invitation may be received as an SMS message or the like, and may contain a link, such as a URL, with the user's mobile data network information encrypted. The link may direct the wireless device 100 to the game hosting server 216 that can be displayed on the display 122. The game hosting server 216 may validate the subscriber and may look up customer preferences, activity, and the like in the SPR 208.

The application 114 may further generate a graphical user interface 300 to provide the ability to share utilizing Twitter™, Facebook™, Instagram™, or the like by providing user inputs 302 that may launch applications associated with the same. The sharing may include sharing rewards such as points, certificates, badges, elevated status, and the like. The graphical user interface 300 of the application 114 may further include other inputs for the user. In one aspect, the graphical user interface 300 may include a redeem button 304. In one aspect, the graphical user interface 300 may include a play again button 306. In one aspect, the graphical user interface 300 may include a listing of rewards and the amount of points needed for the rewards 308. In one aspect, the graphical user interface 300 may include a listing of points earned 310 by the user.

Based on the information in the SPR 208, the game database 210, the game hosting server 216, or another database, the mobile website may provide game options and/or other content. For example, the information in the SPR 208, the game database 210, the game hosting server 216, or another database may suggest that the user enjoys a particular type of game, music, or the like. The mobile website may then provide gamification options relevant to the user's preferred content. Games could include, for example, "spin to win," slot machine, pick a card, shell game, pick one, first-person shooter games, real-time strategy games, multi-user real-time virtual worlds, massively multiplayer online games, micromanagement and macromanagement games, single-player games, multiplayer games, arcade games, video arcade games, simulated gambling type games, fantasy sports games, and the like. Encouraging the use of games and other applications may incentivize the use of wireless services and may allow for more customized promotion of similar content and additional wireless services. For example, if a user plays a slot machine game, the wireless service provider may note that the user enjoys related games such as card games, roulette, and the like. The user's preferences may be stored in the SPR 208 or another database to allow the wireless service provider to send customized offers and advertisements to the wireless device 100 for the use of additional content. Alternatively, the wireless device 100 may download a game, tool, application, or the like to execute locally on the wireless device 100.

When the user selects a particular game or other content to use or download, locally or remotely, the user may earn rewards. In addition, the content may allow the user to earn rewards for completing certain tasks. For example, if a user plays a video or listens to a song, the user may earn points. The user may earn additional points by playing an advertisement, sharing the content via social media, rating the content, commenting on the content, or the like. The user may want to link audio or visual content to a website or social media platform to share photos, video, and the like. Such sharing may earn rewards, encourage wireless service usage, and allow the wireless service provider to gather data for the user's content preferences to provide more customizable service and promotions. In one aspect, the location of the wireless device user may be determined by a global navigation satellite system (GNSS) to provide Location Based Services (LBS). The LBS may be utilized for providing customized prizes and offers specific to user's location and preferences. For example, the GNSS may determine that a user is generally located in the Miami, Fla. area and accordingly prizes and offers may be generated and provided to the user that are specific to the Miami area.

In another example, the user may play a game, which encourages certain behavior and uses wireless services. For example, if a user downloads and uses a particular application, the user may gain rewards. Such applications could include organizational tools such as schedulers, contact organizers, activity tracking tools, and the like. Another type of application could include monitoring physical activity, location, distance traveled, exercise, and the like. The location of the wireless device user may be determined by the GNSS. This may allow wireless service providers to gather information about the location of the user and the types of activities that interest the user so that the wireless service providers can customize and promote particular content and wireless services. Yet another type of application could encourage sending messages or calling contacts to encourage using wireless services.

In yet another example, applications may allow users to earn rewards for sharing their location and activity. The application 114 may allow a user to indicate a location or establishment the user has visited or an activity in which the user has participated. This could be a restaurant, event, or the like. In exchange for indicating a visit or interaction, the wireless service provider could provide rewards for the purchase and use of wireless services, offers for establishments visited and reviewed, other promotional deals, advertisement, coupons, and the like. Such an application may allow wireless service providers to cross-promote with other businesses to encourage the use of wireless services and the patronage of particular establishments.

The rewards earned from using particular content may be used to redeem services, other content, and the like. For example, a user may earn 100 points for downloading, opening, and using a particular application, completing a task, sharing information, using wireless services, and the like. Once the user has accumulated enough rewards, the user may redeem those rewards for a new wireless device, wireless plan upgrades, additional wireless minutes or wireless data, additional content, discounts for purchases, increased ratings and status in certain games and applications, and the like.

Figure 4:
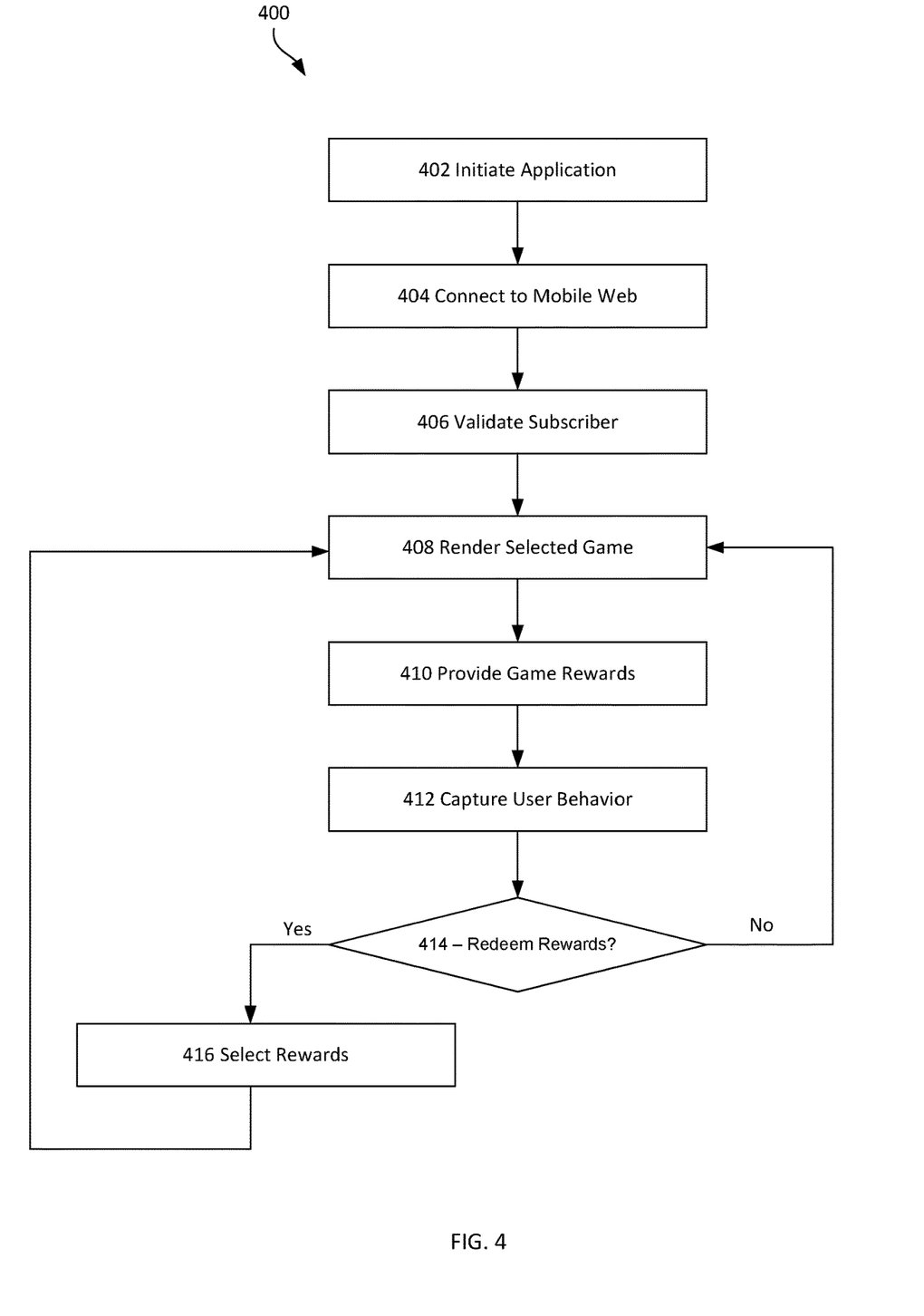
FIG. 4 illustrates an exemplary process for providing mobile gamification on the wireless device of FIG. 1 according to aspects of the present disclosure.

FIG. 4 illustrates a process 400 for providing mobile gamification on the wireless device 100. In step 402, the wireless device 100 may initiate the application 114. Initiating the application at step 402 may include opening the application 114. Initiating the application at step 402 may also include opening an SMS message with a link to a gamification game or mobile website and executing the link to access a game. At step 404, the wireless device 100 connects to the mobile website on the Internet 206. When connecting to the Internet 206, the wireless device 100 may connect to the game database 210 or to a mobile website with one or more games for playing over the Internet 206 or downloading for local execution on the wireless device 100.

At step 406, the SPR 208 validates the subscriber of the wireless device 100. Validating the subscriber at step 406 may include communicating with the SPR 208 to verify subscriber information and preferences. In one aspect, the validation may include the SPR 208 being implemented as a secure device/server. In this aspect, the secure device/server implementation of the SPR 208 provisioning, identification and authorization of the subscriber. This may include the subscriber providing a valid logon identification and logon password and the SPR 208 storing and comparing valid logon identification and logon password information. Once the subscriber has been validated, the process may continue at step 408 to render a selected game. Rendering a selected game at step 408 may include the user selecting a game to download. Alternatively, rendering a selected game at step 408 may include opening and executing a game on a mobile website on the Internet 206. In another alternative aspect, rendering a selected game at step 408 may include opening a game selected from an SMS message with an invitation to play that game locally on the wireless device 100 or remotely on the Internet 206.

At step 410, the process provides game rewards. Providing game rewards at step 410 may include adding points, badges, elevated status, or the like to an accumulated rewards total for a particular user or wireless device 100. Providing game rewards at step 410 may also include adding points while a user is using a game and completes a particular task, and may also include adding points after a user has finished using the game.

After rewards have been provided, the process may move to step 412 to capture user behavior. Capturing user behavior may include documenting user interaction with gamification activities, achievements within gamification activities, type and amount of wireless service used in gamification activities, user location, social media interactions, and the like.

At step 414, the process may allow the user to redeem rewards. Redeeming rewards at step 414 may include providing in-game offers to redeem rewards, displayed or audible offers to redeem rewards after a game has been completed or after a user has finished using a game, messages provided to the wireless device 100 allowing the user to redeem the rewards, and messages displayed the next time a user connects to the game or the game database 210 to offer a redemption of rewards. In step 416, the user may select rewards using the redeemed rewards. Selecting rewards at step 416 may include using redeemed rewards points, badges, elevated status, and the like to select services, products, game options, upgrades, and the like. If the user opts to not redeem rewards at step 414, the user may end the game or return to the selected game by rendering the game at step 408.

Figure 5:
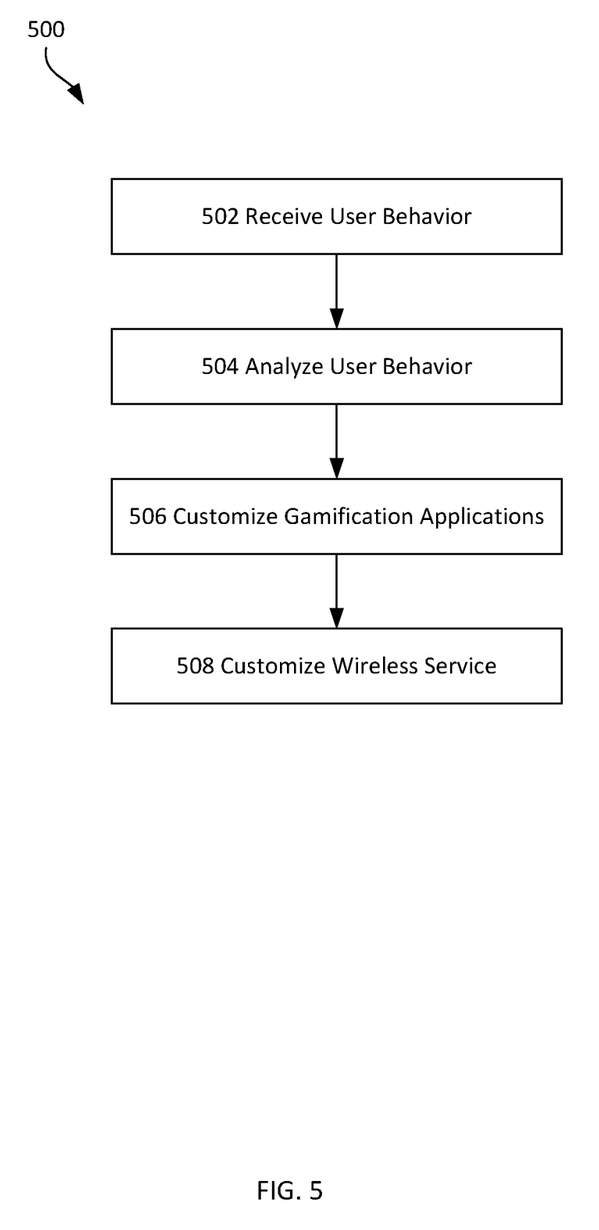
FIG. 5 illustrates a data collection process associated with wireless service gamification according to aspects of the present disclosure.

FIG. 5 illustrates a data collection process 500 associated with wireless service gamification. At step 502, the process receives user behavior. That behavior may include wireless service usage, trends, and habits, and may also include details about gamification activities performed, rewards earned and redeemed, user location, social media interactions, activities, and the like.

In step 504, the process analyzes the behavior received in step 502. For example, the process may analyze which types of wireless service the wireless device 100 has used, how much of any type of wireless service has been used, times and location of particular wireless service usage, types of games and activities executed with the wireless device 100, user preferences associated with gamification activities, and the like.

Based on the analysis of user behavior, the process may, at step 506, customize gamification applications. Customization may include modifying game options and offers based on user preferences and history, providing offers and promotions based on analyzed user preferences, and the like. The process may also, at step 508, customize wireless service options. Customizing wireless service options may include offering different services and prices, offering discounts, offering different promotions, and the like.

The present disclosure has therefore described a device and process for providing mobile gamification on a wireless device associated with wireless services. The disclosed gamification services may apply game mechanics and game design techniques to engage and motivate people to achieve their goals. Businesses may use the disclosed gamification device and process to drive desired user behaviors that are advantageous to their brand. By capturing and analyzing the big data on behaviors, businesses can create a more engaging experience that motivates users. By providing extensive insight into user behavior, big data can indicate what activities, content types, and frequencies are yielding the best results. Data also allows companies to adapt to various user behaviors and motivations. The captured big data may help wireless service providers develop creative ideas to improve systems, devices, and services.

Additionally, rewards such as points, certificates, badges, elevated status, and the like may be earned by users for completing tasks, sharing information, purchasing services, and the like. Wireless service providers may use rewards to encourage particular behavior from users, to promote services, and to gather behavioral and preferential information about wireless service users. Such information may be used to customize services and content, and to optimize the type and frequency of content provided to wireless service users.

Further in accordance with various aspects of the disclosure, the methods described herein are intended for operation with dedicated hardware implementations including, but not limited to processors, microprocessors, PCs, PDAs, SIM cards, semiconductors, application specific integrated circuits (ASIC), programmable logic arrays, cloud computing devices, and other hardware devices constructed to implement the methods described herein.

Aspects of the disclosure may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an inter-network, a backbone network (BBN), a global area network (GAN), the Internet, an intranet, an extranet, an overlay network, Near field communication (NFC), a cellular telephone network, a Personal Communications Service (PCS), using known protocols such as the Global System for Mobile Communications (GSM), CDMA (Code-Division Multiple Access), GSM/EDGE and UMTS/HSPA network technologies, Long Term Evolution (LTE), 5G (5th generation mobile networks or 5th generation wireless systems), WiMAX, HSPA+, W-CDMA (Wideband Code-Division Multiple Access), CDMA2000 (also known as C2K or IMT Multi-Carrier (IMT-MC)), Wireless Fidelity (Wi-Fi), Bluetooth, and/or the like, and/or a combination of two or more thereof. The NFC standards cover communications protocols and data exchange formats, and are based on existing radio-frequency identification (RFID) standards including ISO/IEC 14443 and FeliCa. The standards include ISO/IEC 18092[3] and those defined by the NFC Forum.

The aspects in the disclosure may be implemented in any type of computing devices, such as, e.g., a desktop computer, personal computer, a laptop/mobile computer, a personal data assistant (PDA), a mobile phone, a tablet computer, cloud computing device, and the like, with wired/wireless communications capabilities via the communication channels.

Aspects in the disclosure may be implemented in any type of mobile smartphones that are operated by any type of advanced mobile data processing and communication operating system, such as, e.g., an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like.

It should also be noted that the software implementations of the disclosure as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the disclosure is considered to include a tangible storage medium or distribution medium, as listed herein and including art-recognized equivalents and successor media, in which the software implementations herein are stored.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

Aspects of the disclosure may be web-based. For example, a server may operate a web application in conjunction with a database. The web application may be hosted in a browser-controlled environment (e.g., a Java applet and/or the like), coded in a browser-supported language (e.g., JavaScript combined with a browser-rendered markup language (e.g., Hyper Text Markup Language (HTML) and/or the like)) and/or the like such that any computer running a common web browser (e.g., Internet Explorer™' Firefox™, Chrome™ Safari™ or the like) may render the application executable. A web-based service may be more beneficial due to the ubiquity of web browsers and the convenience of using a web browser as a client (i.e., thin client). Further, with inherent support for cross-platform compatibility, the web application may be maintained and updated without distributing and installing software on each.

Aspects of the disclosure may include a server executing an instance of an application or software configured to accept requests from a client and giving responses accordingly. The server may run on any computer including dedicated computers. The computer may include at least one processing element, typically a central processing unit (CPU), and some form of memory. The processing element may carry out arithmetic and logic operations, and a sequencing and control unit may change the order of operations in response to stored information. The server may include peripheral devices that may allow information to be retrieved from an external source, and the result of operations saved and retrieved. The server may operate within a client-server architecture. The server may perform some tasks on behalf of clients. The clients may connect to the server through the network on a communication channel as defined herein. The server may use memory with error detection and correction, redundant disks, redundant power supplies and so on. Moreover, the server may be a secure server implementing a protocol for secure communication over a computer network. The secure communication may be implemented by HTTPS, which includes communication over Hypertext Transfer Protocol (HTTP) within a connection encrypted by Transport Layer Security or a Secure Sockets Layer. The secure communication may require authentication of the visited website and protection of the privacy and integrity of the exchanged data.

According to an example, the global navigation satellite system (GNSS) may include a device and/or system that may estimate its location based, at least in part, on signals received from space vehicles (SVs). In particular, such a device and/or system may obtain "pseudorange" measurements including approximations of distances between associated SVs and a navigation satellite receiver. In a particular example, such a pseudorange may be determined at a receiver that is capable of processing signals from one or more SVs as part of a Satellite Positioning System (SPS). Such an SPS may comprise, for example, a Global Positioning System (GPS), Galileo, Glonass, to name a few, or any SPS developed in the future. To determine its location, a satellite navigation receiver may obtain pseudorange measurements to three or more satellites as well as their positions at time of transmitting. Knowing the SV orbital parameters, these positions can be calculated for any point in time. A pseudorange measurement may then be determined based, at least in part, on the time a signal travels from an SV to the receiver, multiplied by the speed of light. While techniques described herein may be provided as implementations of location determination in GPS and/or Galileo types of SPS as specific illustrations according to particular examples, it should be understood that these techniques may also apply to other types of SPS, and that claimed subject matter is not limited in this respect.

While the device and method have been described in terms of what are presently considered to be specific aspects, the disclosure need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

The invention claimed is:

1. A device, comprising:
   a transceiver configured to wirelessly transmit data and to wirelessly receive data, via a wireless network provided by a wireless service provider;
   a processor configured to control the transceiver and provide one or more wireless gamification services;
   the transceiver further configured (i) to remotely connect to a subscriber server via the wireless network to at least obtain information of a subscriber and (ii) to at least one of locally download a game, for execution of the game on the device, or remotely execute the game;
   the processor further configured to receive a selection of at least one of a plurality of game rewards;
   the processor further configured to redeem, via the network provided by the service provider, the at least one selected game reward associated with the one or more wireless gamification services;
   a display configured to display the execution of the game, the game rewards being previously displayed to the subscriber after a plurality of interactions therefrom, with at least a portion of (i) the game or (ii) one or more other services of the wireless provider, satisfy one or more criteria;
   a computer readable medium configured to store instructions configured to be executed by the processor;
   wherein the transceiver is further configured to receive a message;
   wherein the previous display of the game rewards comprises displaying the message with a link to a server configured to facilitate the at least one local download or remote execution of the game; and
   wherein the message is sent (i) via a Short Message Service (SMS) of the wireless provider and (ii) based on a campaign, which is obtained from a management database, and on the obtained subscriber information.

2. The wireless device of claim 1, wherein the one or more provided gamification services are used to collect data associated with the wireless device and to provide the data to a server implemented by the wireless service provider via the wireless network.

3. The wireless device of claim 1, wherein the one or more provided gamification services are used to track and monitor implementation of the game, a wireless service usage by the wireless device, and the at least one selected game reward;
   wherein the at least one selected game reward is associated, upon the subscriber completing a task in the game; and
   wherein the server comprises a secure server configured to implement identification and authorization of the wireless device in association with wireless service provided by the wireless service provider.

4. The wireless device of claim 3, wherein the game rewards are earned when completing the task in the game to obtain wireless service upgrades.

5. The wireless device of claim 1,
   wherein the one or more provided gamification services are used to share activity associated with the game via a social media platform; and
   wherein the one or more provided gamification services are used launch the social media platform application to share the activity thereto.

6. The wireless device of claim 2,
wherein the wireless device determines a location of a user with a location determination device and provides the location determined by the location determination device to the server; and
wherein the server is configured to customize prizes and offers specific to a user's location and preferences.

7. The wireless device of claim 2, wherein the data associated with the wireless device provided to the server via the wireless network is utilized by the subscriber server to determine at least one of the following: recommendations, marketing, and promotion of business services.

8. The wireless device of claim 2, wherein the data associated with the wireless device and provided to the server via the wireless network is analyzed and modeled by the subscriber server to increase sales and revenue.

9. The wireless device of claim 2,
wherein the wireless device determines a location of a user with a location determination device and provides the location determined by the location determination device to the server;
wherein the server is configured to customize prizes and offers specific to a user's location and preferences;
wherein the data associated with the wireless device provided to the server via the wireless network is utilized by the subscriber server to determine at least one of the following: recommendations, marketing, and promotion of business services; and
wherein the data associated with the wireless device provided to the server via the wireless network is analyzed and modeled by the subscriber server to increase sales and revenue.

10. The wireless device of claim 1,
wherein the application is further configured to collect data associated with the wireless device and a wireless service used by the wireless device;
wherein the application is further configured to provide the data to a server implemented by the wireless service provider via the wireless network;
wherein the application is further configured to track and monitor implementation of the game, a wireless service usage by the wireless device, and the game rewards;
wherein the game rewards are associated with the wireless services provided by the wireless service provider when completing a task in the game;
wherein the server comprises a secure server configured to implement identification and authorization of the wireless device in association with wireless service provided by the wireless service provider; and
wherein the application is configured to launch a social media platform application to share activity associated with the game via the social media platform.

11. A process, comprising:
wirelessly transmitting data and wirelessly receiving data, with a transceiver via a wireless network provided by a wireless service provider;
controlling with a processor the transceiver and provide one or more wireless gamification services;
remotely connecting with the transceiver to a subscriber server via the wireless network to at least obtain information of a subscriber;
at least one of locally downloading a game, for execution of the game on the device, or remotely executing the game;
receiving a selection of at least one of a plurality of game rewards;
redeeming, via the network provided by the service provider, the at least one selected game reward associated with the one or more wireless gamification services;
displaying, with a display, the execution of the game, the game rewards being previously displayed to the subscriber after a plurality of interactions therefrom, with at least a portion of (i) the game or (ii) one or more other services of the wireless provider, satisfy one or more criteria;
storing, in a computer readable medium, instructions configured to be executed by the processor;
wherein the transceiver is further configured to receive a message;
wherein the previous display of the game rewards comprises displaying the message with a link to a server configured to facilitate the at least one local download or remote execution of the game; and
wherein the message is sent (i) via a Short Message Service (SMS) of the wireless provider and (ii) based on a campaign, which is obtained from a management database, and on the obtained subscriber information.

12. The process of claim 11, further comprising sharing activity associated with the game via a social media platform that launches to share the activity thereto.

13. The process of claim 12, further comprising:
collecting data associated with the wireless device including wireless service usage; and
providing the data to a server via the wireless network.

14. The process of claim 13, wherein the collecting data associated with the wireless device with the wireless device and providing the data to the server via the wireless network is utilized by the subscriber server to determine at least one of the following: recommendations, marketing, and promotion of business services.

15. The process of claim 11, further comprising collecting data associated with the wireless device including wireless service usage and transmitting the data to a server via the wireless network.

16. The process of claim 15, further comprising:
determining a location of a user with the wireless device determined by a location determination device and providing the location to the server; and
customizing prizes and offers with the server specific to a user's location and preferences.

17. The process of claim 15, wherein the at least one selected game reward is associated, upon the subscriber completing a task in the game to obtain one or more wireless service upgrades by the wireless service provider.

18. The process of claim 15, wherein the server comprises a secure server configured to implement identification and authorization of the wireless device in association with wireless service provided by the wireless service provider.

19. The process of claim 13, wherein the collecting data associated with the wireless device provided to the server via the wireless network is analyzed and modeled by the subscriber server to increase sales and revenue.

20. The process of claim 15, further comprising:
determining a location of a user with the wireless device determined by a location determination device and transmitting the location to the server;
customizing prizes and offers with the server specific to a user's location and preferences; and
collecting data associated with the wireless device including wireless service usage and transmitting the data to a server via the wireless network.

* * * * *